United States Patent [19]

Uhl

[11] Patent Number: 5,023,467
[45] Date of Patent: Jun. 11, 1991

[54] METHOD AND AN INTERVAL SWITCH COMPRISING A CIRCUIT ARRANGEMENT FOR CONTROLLING THE INTERVAL OF TIME BETWEEN WIPING MOVEMENTS OF WIPERS IN VEHICLES

[75] Inventor: Günter Uhl, Unterreichenbach, Fed. Rep. of Germany

[73] Assignee: Doduco GmbH & Co. Dr. Eugen Durrwachter, Pforzheim, Fed. Rep. of Germany

[21] Appl. No.: 274,803
[22] PCT Filed: Mar. 17, 1988
[86] PCT No.: PCT/EP88/00215
§ 371 Date: Nov. 16, 1988
§ 102(e) Date: Nov. 16, 1988
[87] PCT Pub. No.: WO88/06989
PCT Pub. Date: Sep. 22, 1988

[30] Foreign Application Priority Data

Mar. 17, 1987 [DE] Fed. Rep. of Germany ....... 3708547

[51] Int. Cl.$^5$ ............................................. H02P 1/04
[52] U.S. Cl. ................................. 307/10.1; 200/443; 200/444; 200/DIG. 2; 15/250.13
[58] Field of Search ............... 307/9.1, 10.1; 318/280, 318/281, 282, 283, 284, 285, 286, 443, 444, DIG. 2; 15/250.13

[56] References Cited

U.S. PATENT DOCUMENTS

| 4,375,610 | 3/1983 | Nagaoka et al. | 318/444 |
| 4,388,574 | 6/1983 | Bois et al. | 318/444 |
| 4,492,904 | 1/1985 | Graham | 318/D12 |
| 4,625,157 | 11/1986 | Phillimore | 318/444 |
| 4,859,919 | 8/1989 | Tracht | 318/444 |

FOREIGN PATENT DOCUMENTS

| 0135438 | 3/1985 | European Pat. Off. . |
| 0136008 | 4/1985 | European Pat. Off. . |
| 2649413 | 5/1978 | Fed. Rep. of Germany . |
| 3529004 | 11/1986 | Fed. Rep. of Germany . |

OTHER PUBLICATIONS

Elektor, No. 60, Apr. 1980, "Intelligent Wiper Delay", pp. 18-23, 'Instruction for Use'.

Primary Examiner—A. D. Pellinen
Assistant Examiner—Jeffrey A. Gaffin
Attorney, Agent, or Firm—Dvorak and Traub

[57] ABSTRACT

In the method of controlling the wiping interval, the interval of time between two consecutive wiping movements, of which at least the second wiping movement was started arbitrarily, is measured, the measured value is stored and is subsequently used as interval time unless a different interval time becomes stored due to another arbitrary starting of wiping movements, or unless the interval operation of the wiper is interrupted or unless the control circuit is deenergized.

23 Claims, 8 Drawing Sheets

METHOD AND AN INTERVAL SWITCH COMPRISING A CIRCUIT ARRANGEMENT FOR CONTROLLING THE INTERVAL OF TIME BETWEEN WIPING MOVEMENTS OF WIPERS IN VEHICLES

The invention proceeds from a method of controlling the interval of time between wiping movements of wipers in vehicles, wherein the interval of time between two consecutive wiping movements is observed and is set by means of a selector switch, which has at least the switch positions "wiping operation OFF" and "interval operation ON", and by means of an electric control circuit, by which the interval of time between two consecutive wiping movements (hereinafter called interval time) is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized.

In interval switches for controlling the interval of time between wiping movements of wipers, as they are nowadays installed in vehicles, there is almost always predetermined a fixed interval time between two consecutive wiping movements. Therefore, it frequently occurs in practical operation that this interval time is too long or too short, depending on the intensity of rain falling at the moment. To overcome this problem, the DE-35 29 004 C1 has already disclosed a method for influencing the interval of time between wiping movements of wipers. The generic part of claim 1 has been formed in accordance with this known method. The known method proceeds from the fact that the vehicle has an actuating switch for the wipers, which has the consecutive switch positions "OFF", "interval operation ON" and "continuous operation ON". This prerequisite is not fulfilled in many motor vehicles, so that it is merely for this reason why the application of the known method in kits for retrofitting vehicles that have already been delivered is limited.

Proceeding from the switch position "interval operation ON" the wiping interval in the method described in the DE-35 29 004 C1 is shortened by changing over to the switch position "continuous operation ON" and by returning to the position "interval operation ON", whereas the wiping interval is prolonged by changing over to the position "OFF" and by returning to the position "interval operation ON". This method has various disadvantages. On the one hand, it is rather complicated for the driver that he has to perform different operations for prolonging and shortening the wiping interval. Moreover, it is disadvantageous that for shortening the wiping interval the switch position "continuous operation ON" is required, for the corresponding electrical line from the switch to the wiper motor leads directly, i.e. by by-passing the interval relay, to the motor of the wiper. For realizing the method described in the DE-35 29-004 C1 one can therefore not simply replace the interval relay by a modified component containing an interval control circuit which operates according to the known method. However, this would be a prerequisite for a practicable possibility for retrofitting vehicles that have already been delivered.

In the DE-31 08 263 A1 a programmable apparatus for changing the wiping interval is described, which the driver must turn off for prolonging the wiping interval between two wiping movements for the period by which he wants to prolong the wiping interval. To shorten the wiping interval the driver must turn off the apparatus during a wiping movement and turn it on again after the desired new interval time. What is disadvantageous in this known apparatus is the fact that for prolonging the wiping interval the driver must perform a different operation than for shortening the wiping interval. The process of shortening the wiping interval particularly calls for his attention, thus distracting him from the traffic, because he must turn off the apparatus during the short period of a wiping movement. Moreover, it is rather difficult to retrofit vehicles that have already been delivered with the known apparatus for changing the wiping interval, as this apparatus comprises two relays and a separate switch for actuating the apparatus in addition to the actuating switch of the wiper, which is already provided in the motor vehicle. It is therefore not enough to provide another relay in combination with the circuit for changing the wiping interval instead of the wiping interval relay which is already present in the motor vehicle, but rather, there must also be provided or created a room for accommodating a second relay and a further actuating switch.

From the DE-30 08 946 A1 a programmable wiper interval switching device is known, which upon actuation of its actuating switch first of all initiates a wiping operation, and must be actuated once more to initiate a second wiping operation. The interval between the first two wiping operations is then kept in storage, and the subsequent wiping operations are initiated in corresponding intervals of time, where the intervals can also be changed automatically in dependence on the driving speed or the humidity detected by a humidity sensor. For programming a changed interval of time it is necessary that a turn-off operation has been performed in the meantime, upon which a new programming can be performed in the manner described above. Moreover, it is necessary to newly set the wiping interval whenever the interval operation of the wiper is turned on. Such a procedure is relatively complicated.

It is the object of the invention to provide a method and an interval switch comprising a circuit arrangement for controlling the interval of time between wiping movements of wipers in vehicles, which is characterized by an increased ease of operation and by means of which the interval time can both be shortened and prolonged individually by one and the same mode of operation, where a particular suitability for retrofitting is desired.

The object is solved by a method wherein the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored. The method is performed by means of the interval switch which has a turn-on subassembly via which a control circuit is energized, a programmable memory for the interval time, a selectively incrementing and decrementing counter for determining the interval time and for receiving the contents of the programmable memory as an initial count $Z_a$ for a decrementing operation, a clock for delivering pulses to the counting input of the counter, a decoder for detecting the lowest count ($Z_o=0$), another decoder for detecting the highest possible count ($Z_{max}$), and a further memory, which succeeds the another decoder and the contents of which states whether the highest possible count ($Z_{max}$) has been reached during the last incrementing operation, a further decoder for detecting counts $Z_c$ which are lower than $Z_{max}$ and higher than a predetermined count $Z_p>Z_o$, a selector switch for selecting the mode of operation of the wiper, and a pulse generator for delivering a pulse in response to each actuation of the selector switch, and gates, by which said components of the control circuit are logically connected. Advantageous embodiments of the invention are subject matter of the respective subclaims.

In the method in accordance with the invention a time measuring operation is started with a first wiping movement that has been started by actuating the selector switch, and is terminated again with the next wiping movement that has arbitrarily been initiated by the driver. The interval time thus measured, which is preferably measured from the beginning of the first wiping movement until the beginning of the second wiping movement, but could also be measured from the end of the first wiping movement until the end of the second wiping movement, is predetermined as interval time for the subsequent wiping movements, until the interval time is changed again in the manner described above.

The interval time adapted in this way is optimal, because the driver terminates the measurement of the interval time precisely in that moment in which he considers a new wiping movement to be expedient. A new setting of the interval time will only be necessary when the intensity of the rainfall changes considerably, or when the vehicle was out of operation in the meantime and the stored interval time was lost because the control circuit had been deenergized.

The time measuring operation is always started by moving the selector switch to the switch position "wiping operation OFF". In this way, it is always possible for the driver to arbitrarily interfere in the operation of the interval switch by initiating a wiping movement, and to start the programming of a changed interval time.

If during the drive the interval operation is turned off for an extended period, which exceeds a predetermined time limit —preferably approximately 45 s —, the interval time stored last is expediently kept in storage. This has the advantage that for instance when the interval operation is temporarily terminated while driving in a tunnel, the previously programmed and stored interval time is not lost, but that at the exit of the tunnel the interval operation can be resumed with the still stored interval time.

The interval time value stored last is preferably also kept in storage when the wiper is switched to continuous operation. This has the advantage that for instance in the case of overtaking manoeuvres on a wet road, where an increased amount of water impinges on the windshield, one can briefly switch over to the continuous wiping operation, and after switching back to the interval operation the same is automatically performed with the interval time programmed last.

When the vehicle is put into operation the procedure is best started with a predetermined fixed interval time, which can be contained in a read-only memory. For this predetermined fixed interval time there is preferably selected a mean value, which frequently occurs in practice, preferably about 5 s, but expediently not more than 15 s. In this way it is achieved that the driver need not always set a new interval time when he wants to operate the wiper in the interval mode; rather, in many cases it will not at all be necessary to set the interval time.

The method in accordance with the invention is easy in its application. It does not call for a particular attention on the part of the driver and immediately leads to the desired result. Since the setting of the new interval time both for prolonging and for shortening is equally effected by arbitrarily initiating two wiping movements, namely by turning off and turning on again the interval switch, preferably by means of the selector switch which is usually mounted at the steering column, the driver can easily set an optimum wiping cycle without being particularly distracted from the traffic. Expediently, one should make sure that interval times which are shorter than a single wiping operation are not stored.

During overtaking manoeuvres or in the case of oncoming traffic on a wet road it happens that a major quantity of water or slush is briefly flung onto the windshield from overtaken or oncoming vehicles To quickly get the windshield clear again in such a case, it is preferably provided that by actuating a switch, which has a switch position "premature wiping operation ON", the current interval time is shortened without a change of the stored interval time, so that a premature wiping operation is performed with which the use of the stored interval time is resumed. The switch in question expediently is the selector switch, which is provided in any case and for this purpose has the switch position "premature wiping operation ON" as additional switch position. In this way it is possible to start a single wiping operation by a simple switch actuation without changing the stored interval time; i.e., with this arbitrarily started wiping operation the use of the old, stored interval time is resumed, and a further wiping operation will not be performed until the stored interval time has passed, unless a further wiping operation is arbitrarily started beforehand.

Nowadays, vehicles are generally equipped with a washer, where upon actuation of a switch, in particular by pulling an actuating lever mounted at the steering column against the steering wheel, water is sprayed onto the windshield and —mostly with a certain delay—the wiper is started. When the actuation of the switch is terminated by releasing the actuating lever, the spraying of water is immediately terminated, but the wiper is still moving and makes another three to five wiping movements. In the case of such a washer the method in accordance with the invention expediently provides for the wiping-washing function to be started in the same way as it was described above in connection with the premature wiping operation. With the end of the last wiping operation of the wiping-washing function the use of the stored interval time is then resumed.

The control circuit, which is required for performing the method in accordance with the invention, can be designed as a very inexpensive and compact integrated circuit; retrofitting can easily be effected in that a conventional interval switching relay is replaced by a switching relay with a circuit arrangement in accordance with the invention; in its housing, which can be as small as or even smaller than the housing of a conventional interval switching relay, there can also be accommodated the integrated control circuit. A replacement or modification of the selector switch, which preferably comprises an actuating lever and is mounted at the steering column of the vehicle, and of the electrical network in the vehicle is not necessary.

It is a further advantage that when using an interval switch, which operates in accordance with the invention, there is no longer required a wiper motor having two speeds, because the lower one of the two speeds can also be realized by an interval operation with a short interval time. The second drive winding, which is otherwise provided in the wiper motor, is therefore not necessary, so that less expensive wiper motors can be used when such an interval switch is already included in the first equipment of motor vehicles.

The inventive control circuit of the interval switch is described in detail by means of the attached drawing.

Figure 1:
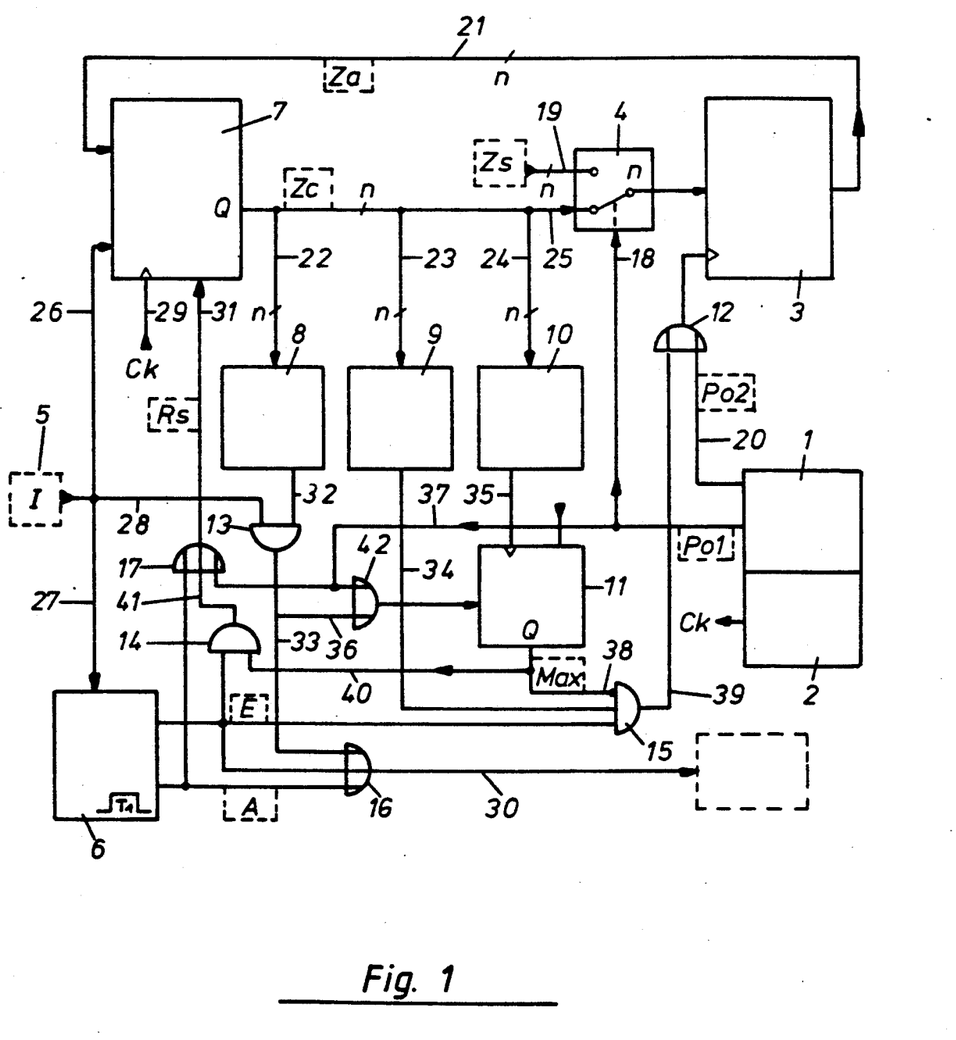
FIG. 1 is a circuit diagram of a control circuit, which allows the performance of the method in accordance with the invention.

The control circuit comprises a turn-on subassembly 1, a clock 2 for generating clock pulses $C_k$ with the constant clock frequency $f_c$, a memory 3 for storing the interval time between two wiping movements, a pulse-controlled change-over switch 4, a selector switch 5 for selecting the mode of operation of the wiper, a pulse generator 6 for generating turn-on and turn-off pulses of the duration $T_1$, a counter 7, three decoders 8, 9 and 10 for different counts, a memory 11 and a number of gates 12 to 17 and 42, by which the aforementioned components are logically connected.

The turn-on subassembly 1 connects the control circuit with a power source, in particular with the vehicle battery, and contains two pulse generators, which upon connection of the operating voltage (which is preferably effected by turning on the ignition of the vehicle) deliver a longer pulse Po1 and a shorter pulse Po2, which preferably end at the same time. The pulse Po1 is delivered to the pulse-controlled change-over switch 4 by a line 18 and effects that for the duration of the pulse Po1 said change-over switch is in its switching condition in which it connects the line 19 with the input of the memory 3. Via the line 19 a predetermined value $Z_s$, which represents a predetermined fixed interval time, is loaded into the memory 3 as soon as the same receives the pulse Po2, which it receives via a line 20 or the OR gate 12.

The output of the memory 3 is connected with the data input of the counter 7 by a line 21, the output Q of said counter being connected with the decoder 8 by a line 22, with the decoder 9 by a line 23, with the decoder 10 by a line 24, and with the pulse-controlled change-over switch 4 by a line 25, and by said change-over switch with the data input of the memory 3.

The selector switch 5 is first connected by a line 26 with an input of the counter 7, which serves the determination of the counting direction, second by a line 27 with the pulse generator 6, and thirdly by a line 28 with the AND gate 13. When turning on the wiper by means of the selector switch 5, the counter 7 is actuated such that it operates as decrementing counter and the clock pulses $C_k$, which are delivered to its counting input by a line 29, are deducted from an initial count $Z_a$. Moreover, when turning on the wiper by means of the selector switch 5, the pulse generator 6 is induced to deliver a turn-on pulse E, which is first delivered to the AND gate 14, second to the NAND gate 15, and thirdly to the OR gate 16. The output of the OR gate 16 is connected with the drive of the wiper by a line 30; whenever a pulse appears at the output of the OR gate 16, a wiping movement is started.

When turning off the wiper by means of the selector switch 5, the counter 7 is switched over, so that it operates as incrementing counter, and the pulse generator 6 is induced to deliver a turn-off pulse A via a second output, which turn-off pulse is on the one hand delivered to the OR gate 16 and on the other hand to the OR gate 17, whose output is connected by a line 31 with a reset input of the counter 7. By a line 32, the same reset input of the counter 7 is also connected with the turn-on subassembly 1, which resets the counter 7 to zero when the operating voltage has been turned on by means of the pulse Po1.

The decoder 8 serves the detection of counts $Z_o=0$ up to a predetermined count $Z_p \geq 0$, and when such a count is reached, the decoder 8 delivers a signal to the AND gate 13 by the line 32, the output of which AND gate is connected by a line 33 with one of the three inputs of the OR gate 16.

The decoder 9 serves the detection of counts which are lower than the maximum count $Z_{max}$, but higher than the predetermined count $Z_p$. When such a count is detected, a signal is delivered by the line 34 to one of the two non-inverting inputs of the NAND gate 15.

The decoder 10 serves the detection of the maximum count $Z_{max}$. When this count is detected, a signal is delivered by the line 35 to the memory 11, which can merely store two values, namely the value 1, when the maximum count has been reached, and the value 0, when the memory 11 has been reset; resetting can on the one hand be effected by a line 36, which connects the reset input of the memory 11 by an OR gate 42 with the output of the AND gate 13; moreover, the memory 11 can at first be reset by the pulse Po1, which is delivered to the reset input of the memory 11 by the line 37 and the OR gate 42. The output of the memory 11 is connected by a line 38 with the inverting input of the NAND gate 15, whose output is connected by a line 39 with the OR gate 12. Moreover, the output of the memory 11 is connected by a line 40 with the AND gate 14, and whose output is connected by a line 41 with the OR gate 17.

Figure 2:
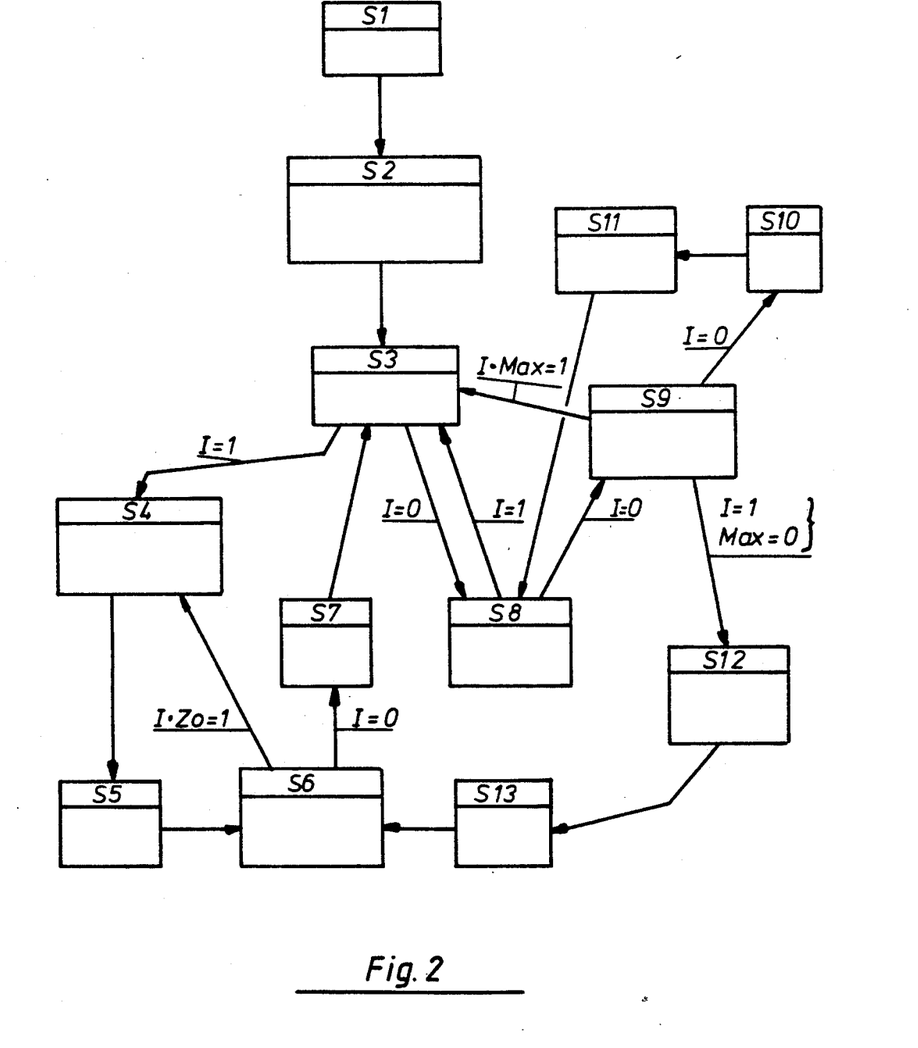
FIG. 2 is a state diagram which illustrates the mode of function of the control circuit represented in FIG. 1.

The mode of function of the circuit will subsequently be described by means of the state diagram represented in FIG. 2.

When the operating voltage is switched on by means of the turn-on subassembly 1, the control circuit is in the state S1. The turn-on subassembly 1 delivers the pulses Po1 and Po2 and enters the state S2, in which the value $Z_S$ is stored in the memory 3 as starting value, and the memory 11, which indicates that the maximum possible count $Z_{max}$ has been reached, is reset to zero. The value $Z_S$ corresponds to a predetermined fixed interval time, with which the control circuit starts.

Then, a reset pulse $R_S$ is generated in the state S3, and the counter 7 is reset to zero by the signal Po1 coming from the turn-on subassembly.

Subsequently, it is assumed that the selector switch 5 is in its OFF position (switching condition I=0): in this case, the counter 7 operates as incrementing counter and counts the pulses $C_k$ delivered by the clock 2, passes through the state S8 (count $\geq Z_p$) and the state S9, where the actual count $Z_c$ is higher than $Z_p$, and reaches the state S10, where the maximum possible count $Z_{max}$ is reached. This highest count is detected by the decoder 10, which therefore enters the value Max=1 into the memory 11. By overflowing the counter 7 returns to the count $Z_o=0$, and the counter 7 starts again to increment the pulses $C_k$ (state S8 and S9).

When the wiper is turned on during incrementing in the state S8 (I=1), i.e. not later than when the predetermined count $Z_p$ has been reached, the control circuit passes through the states S3, S4, S5 and S6. For the pulse generator 6 delivers a turn-on pulse E, which resets the counter 7 to $Z_o=0$ by the AND gate 14 and the OR gate 17, and at the same time starts a first wiping movement by the OR gate 16. If in this phase there is still the value 1 in the memory 11, the memory 11 is reset to the value 0 by the line 36 coming from the AND gate 13. At the same time, the value $Z_S$ stored in the memory 3 is transferred to the counter 7 as initial count $Z_a$, and the counter, which now operates as decrementing counter, decrements proceeding from this initial count $Z_a$. When the count $Z_o=0$ is reached, a wiping movement is again started by the AND gate 13, the line 33, the OR gate 16 and the line 30, the counter 7 is reset, and a new cycle starts via the states S4, S5 and S6. This corresponds to an operating mode of the interval circuit, where the interval time stored in the memory 3 just suits the driver. The same cycle is also reached when the selector switch 5 has already been turned on when switching on the operating voltage (in the state S1 and in the state S2) or when the counter 7 is reset for the first time (state S3).

When the interval time between two wiping movements is to be prolonged or shortened, the driver actuates the selector switch 5 in the state S6 before reaching the count $Z_o=0$. The turn-off pulse A of the pulse generator 6 generated in the process starts on the one hand a further wiping movement by the OR gate 16, and at the same time resets the counter 7 to zero by the OR gate 17 (states S7 and S3). The counter 17, which now operates as incrementing counter, starts to count the delivered pulses $C_k$ (states S8 and S9). When the windshield of the vehicle has become so moist after some time that the driver would like to have it wiped, he again actuates the selector switch 5. At this moment, the control circuit will be in the state S9. The counting operation is interrupted upon actuation of the selector switch 5, and the decoder 9 comes into action; the two non-inverting inputs of the blocking gate 15 have received the turn-on pulse E and the output signal of the decoder 9, the inverting input of the blocking gate 15 receives the signal Max=0 from the memory 11, which signal means that in the counter 7 the maximum count $Z_{max}$ has not been reached. Only in this state will the blocking gate 15 deliver a signal to the memory 3 via the OR gate 12, which leads to the fact that the actual count is transferred to the memory 3 by the line 25 and the change-over switch 4; the actual count includes the interval time between the two preceding wiping movements, which has been manually initiated by the driver. This interval time is adapted to the amount of rain falling at the moment, so that the driver can assume that another change of the interval time will only be necessary when the amount of the falling rain has changed considerably.

The newly stored interval time (state S12) is transferred to the counter 7 as new initial count $Z_a$, which counter 7 starts to decrement when the wiping movement is initiated (state S13): the control circuit is again in the cycle of the states S6-S4-S5-S6.

When the counter 7 overflows after the interval operation has been turned off, a new interval time is not entered into the memory, but rather, the interval time stored last, which corresponds to the count $Z_a$, is kept in storage.

The count $Z_p$, up to which it is counted in the state S8, is selected so low that it corresponds to an interval time of only a few seconds, preferably not more than 2 s. In this way it can be ensured that the driver cannot set an interval time which is shorter than an individual wiping operation. When the selector switch 5 is in its switch position "wiping operation OFF", and when the control circuit has reached the state S9 via the states S1, S2, S3 and S8, and when in this state, before reaching the maximum count $Z_{max}$, the selector switch 5 is brought to its switch position "interval operation ON", so that the counting operation is stopped, the actual count $Z_c$ is transferred in the way described above to the memory 3 as a measure for a new interval time (state S12), a wiping movement is started (state S13) and the state S6 is reached with which the cycle S6-S4-S5-S6 starts again.

The memory 3 and the counter 7 need not have a high capacity. An appropriate circuit design is as follows:

Design of the memory 3 and the counter 7 for a bit number of n=7 bits, frequency of the clock 2: $f_c=3$ Hz, predetermined fixed starting value for the interval time: 5 s corresponding to a value $Z_s=15$, which must initially be loaded in the memory 3, length of the pulses of the pulse generator 6: T1=1 ms.

In this way, an interval circuit is obtained, which has interval times between 2 s and 43 s, each adjustable in steps of ⅓ s.

Figure 3:
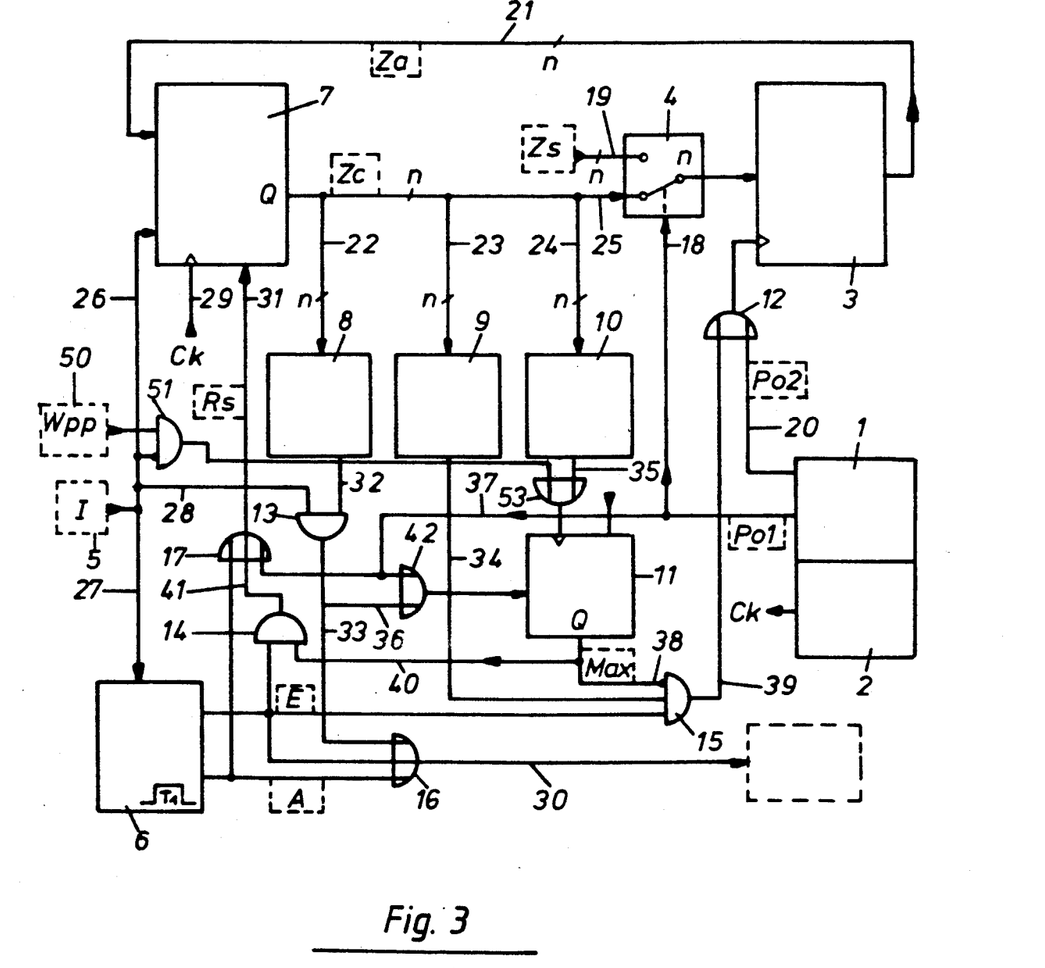
FIG. 3 is a circuit diagram of a control circuit, which has been completed with respect to the circuit diagram represented in FIG. 1.

The circuit diagram represented in FIG. 3 only differs from the circuit diagram represented in FIG. 1 in that there is additionally provided a sensor 50, which is in a position to detect whether the wiper is in its position of rest or not. This sensor can be what is called a parking switch, which is commonly used in wipers, and whose object is to ensure that when the actuating switch of the wiper is moved to the switch position "OFF" the wiper always moves to its position of rest, which is located in a certain region (subsequently referred to as parking region) at the one side of the field to be wiped (see FIG. 5). The parking switch 50 ensures that the current for the wiper motor is only interrupted when the wiper is in the parking region. At the parking switch 50 there can thus be obtained a signal which indicates whether the current to the wiper motor is interrupted, i.e. whether the wiper 52 is in the parking region; this signal is referred to as Wpp=0. At the parking switch 50 there can furthermore be obtained a signal which indicates that the current to the wiper motor is not interrupted. This signal is referred to as Wpp=1. Together with the signal of the selector switch 5, which indicates whether the interval operation is turned on (I=1) or whether the interval operation is turned off (I=0), it can thus be recognized whether the wiper function "continuous operation ON" is turned on, as in the case of "continuous operation ON" the selector switch 5 will turn off the interval operation (I=0): the presence of the signals I=0 and Wpp=1 means that the wiper is turned on to perform a continuous operation. The common occurrence of the signals I=0 and Wpp=1 can therefore be utilized to recognize the continuous operation within the control circuit, namely in that as a result of the common occurrence of these two signals the memory 11 is set to that value Max=1 to which the memory 11 is otherwise set when the decoder 10 detects that the counter 7 has reached its maximum count $Z_{max}$. The outputs of the selector switch 5 and the sensor 50 are therefore connected with the input of the memory 11 by the NAND gate 51 and an OR gate 53. By the OR gate 53 the output of the decoder 10 is also connected with the memory 11. By means of this completion of the control circuit it is prevented that during a changeover from the continuous operation to the interval operation or also from the switch position "wiping operation OFF" to the interval operation, when the continuous operation had been turned on previously, a new interval time is set, which is not expedient in this case. In the state diagram in FIG. 4 this completion of the control circuit has been taken into account in that it is stated that when changing over to the continuous operation of the wiper (I=0 and Wpp=1) proceeding from the states S8 and S9 the memory 11 is set to the value Max=1, so that the control circuit is kept in the states S8 and S9 during the continuous operation, but cannot change over to the state S12, in which otherwise a new interval time would be stored.

Figure 6:
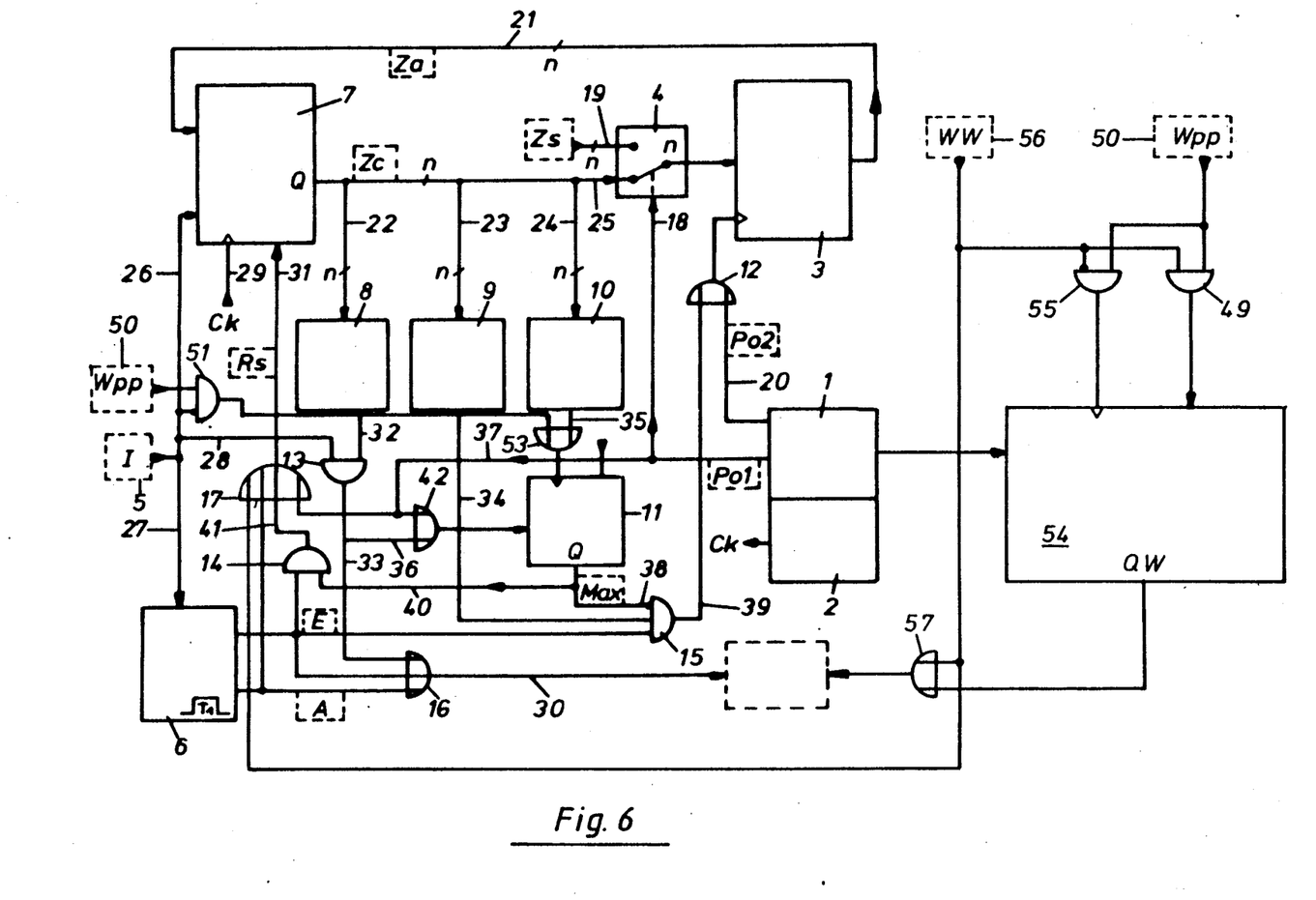
FIG. 6 is a circuit diagram of a control circuit, which has again been completed with respect to the circuit diagram represented in FIG. 3.

The circuit diagram shown in FIG. 6 merely differs from the circuit diagram shown in FIG. 3 in that a further counter 54 is provided whose counting input is connected by a NAND gate 55 with the sensor 50 and the actuating switch 56 of a washer known per se. By means of a separate setting input the counter 54 can be set to a predetermined value Nw, which indicates how many wiping movements will yet be performed by the wiper after the actuating switch 56 has moved to its switch position "wiping-washing operation OFF". During the change-over to this switch position the water pump of the washer is usually put out of operation immediately, so that no more washing water is sprayed onto the windshield. The wiper, however, usually runs on. The after-running typically amounts to three to five wiping operations. In conventional washers the after-running of the wiper is determined by a timing relay, i.e. by the charging or discharging time of a capacitor. Due to a scattering of the capacity values of the capacitors there is a corresponding scattering of the after-running times in the known washers, which results in a different number of after-wiping operations. This is different in the inventive interval switch with wiping-washing function, as it is represented in FIG. 6, because in this case the after-wiping operations are not determined by a timer, but are precisely counted. For this purpose, the counter 54 is set at the value Nw by actuating the switch 56 (WW=1), when at the same time the wiper is located outside its parking region (Wpp=1). For this purpose, the actuating switch 56 and the sensor 50 are connected with the setting input of the counter by an AND gate 49. This counter 54 will subsequently be referred to as follow-up counter. Because the actuating switch 56 and the sensor 50 are connected with the counting input of the follow-up counter 54 by the NAND gate 55, the follow-up counter is decremented to zero by means of the signal Wpp occurring once with each wiping operation, when the actuating switch 56 moves to its switch position "wiping-washing operation OFF" (WW=0), so that upon termination of the washing operation the wiper performs the current wiping movement and in addition Nw further wiping movements. As long as the count of the follow-up counter 54 is other than 0, the same delivers an output signal which is supplied to the wiper motor via an OR gate 57. The wiper motor is controlled as long as the count of the follow-up counter 54 is other than 0. The OR gate 57 is furthermore connected with the actuating switch 56, so that the wiper motor will start immediately upon actuation of this switch 56.

Figure 4:
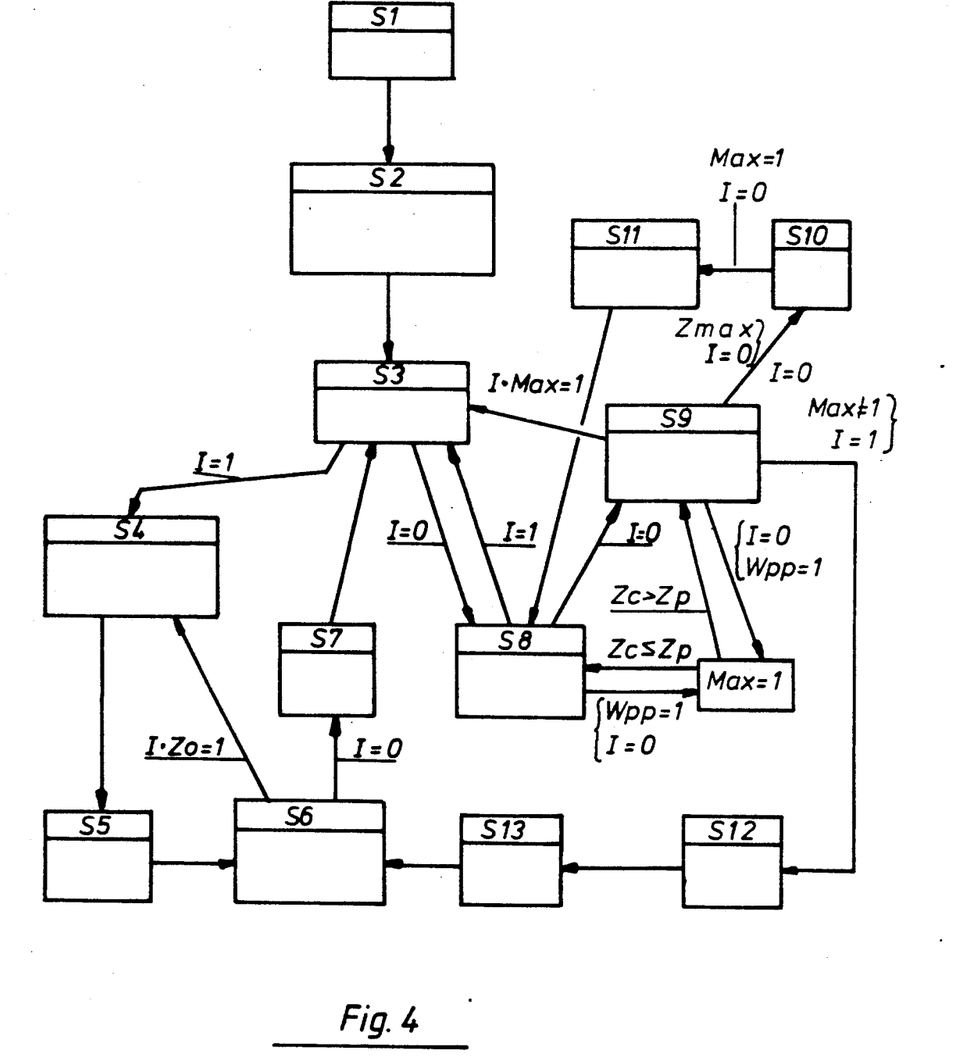
FIG. 4 is a state diagram, which illustrates the mode of function of the control circuit represented in FIG. 3.
Figure 5:
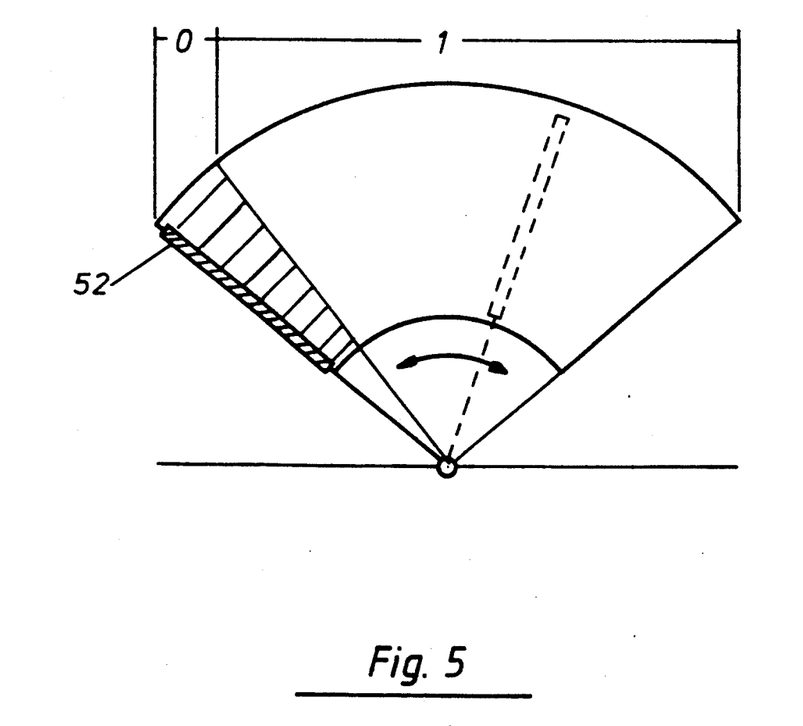
FIG. 5 is a representation of the field to be wiped and the positions which the wiper can occupy therein.
Figure 7:
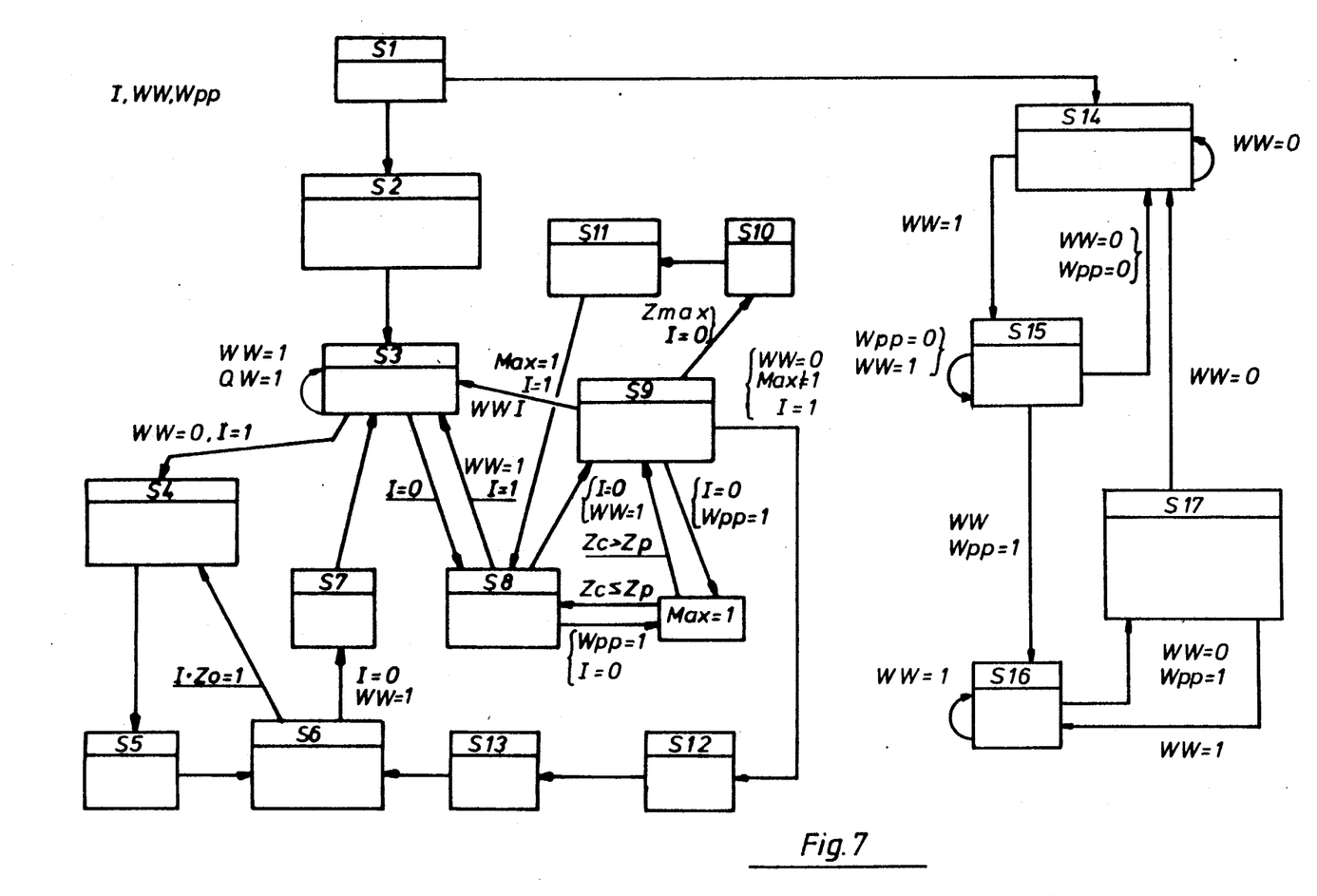
FIG. 7 is a state diagram which illustrates the mode of function of the control circuit represented in FIG. 6.

FIG. 7 shows the state diagram corresponding to the circuit diagram in accordance with FIG. 6, which state diagram differs from the state diagram shown in FIG. 4 only by the additional wiping-washing function. In the state S14 the wiper is turned off, the follow-up counter 54 does not deliver a signal (QW=0). As soon as the actuating switch 56 is actuated (WW=1), the circuit enters the state S15, in which the wiper is running. The simultaneous occurrence of the signal WW=1 and of the signal Wpp=1, which confirms that the wiper is indeed running, makes the circuit enter the state S16, in which the follow-up counter is set at the value Nw, upon which there appears at the output of the follow-up counter the signal actuating the after-running of the wiper, which signal is supplied to the OR gate 57 (signal QW=1). When the actuating switch 56 moves to its switch position "wiping-washing operation OFF", for instance in that a corresponding actuating lever is released, the circuit enters the state S17, in which the follow-up counter 54 is decremented to 0. Then, the circuit enters the state S14, unless the actuating switch 56 was again actuated in the meantime, so that the control circuit would enter the state S16. The circuit will also change over from the state S15 into the state S14 when the actuating switch 56 is actuated only briefly. Briefly should mean that the signal WW is already 0 again before the signal becomes Wpp=1. In this case a single wiping operation is possible, by means of which the current pause in the interval operation is shortened without changing the set interval time. In this way a premature wiping operation can be initiated during the interval operation, if this should be necessary, for instance because a gush of water has been flung onto the windshield by an oncoming car.

Since the wiping-washing function can be actuated during the interval operation, it is expedient to reset the counter 7 by actuating the switch 56. For this purpose, the switch 56 is connected with the OR gate 17. In this way, the counter 7 is reset to initiate a single wiping operation, even when the switch 56 is only actuated for a short time, and the counting of the interval time will only be restarted after the last wiping movement initiated by the switch 56.

It should also be noted that when the control circuit is turned on by means of the turn-on subassembly 1, the follow-up counter 54 is in any case reset to 0 (see FIG. 6).

Figure 8:
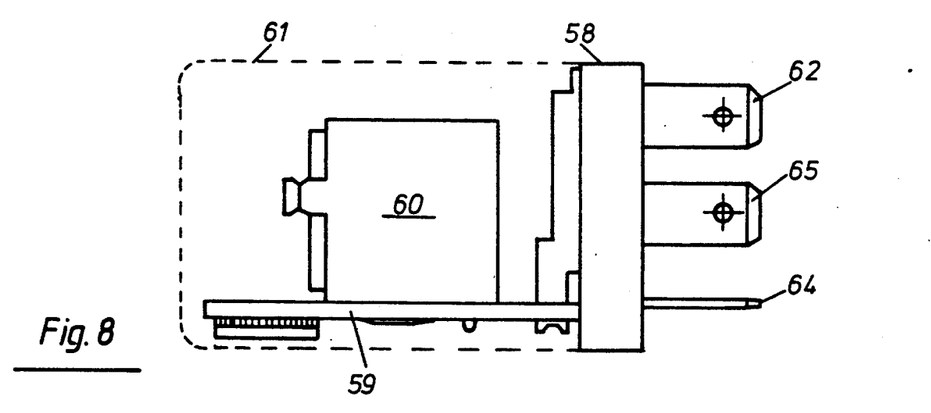
FIG. 8 shows a plug-in interval switch comprising a terminal base and a printed circuit board, which on its one side carries a relay and on its other side a control circuit.
Figure 9:
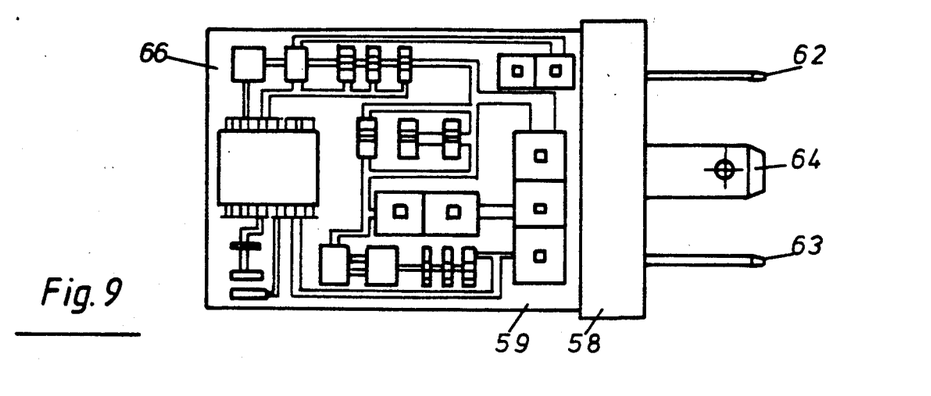
FIG. 9 shows the interval switch of FIG. 8 in a position rotated by 90° in a view of that side of the printed circuit board which carries the control circuit.
Figure 10:
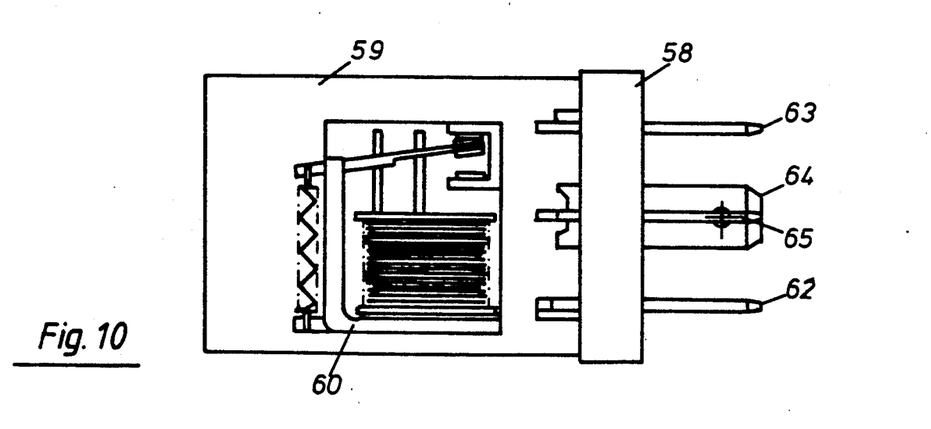
FIG. 10 shows the interval switch in a view of that side of the printed circuit board which is located opposite as compared to FIG. 9.

The interval switch represented in FIGS. 8 to 10 comprises a base 58 with a plurality of plug-in contacts 62, 63, 64 and 65. The base 58 furthermore carries a printed circuit board 59, on whose one side there is arranged a relay 60 for actuating the wiper motor, and on the opposite side an inventive control circuit 66. The printed circuit board 59 comprising relay 60 and control circuit 66 is enclosed by a housing 61, which is only schematically indicated in FIG. 8 and is mounted on the base 58. The dimensions of the interval switch and its plug-in contacts 62 to 65 are chosen such that it can be easily replaced by a conventional interval switch.

I claim:

1. A method of controlling the interval of time between wiping movements of wipers in vehicles, wherein the interval of time between two consecutive wiping movements is determined and is set by means of a selector switch, which has at least the switch positions "wiping operation OFF" and "interval operation ON", and by means of an electric control circuit, by which the interval of time between two consecutive wiping movements (hereinafter called interval time) is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized, characterized in that the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored.

2. A method according to claim 1, characterized in that the interval time value stored last is kept in storage even during an interruption of the interval operation until the control circuit is deenergized.

3. A method according to claim 1, characterized in that the interval wiping operation begins with a predetermined fixed interval time when the selector switch is moved to its switch position "interval operation ON" for the first time.

4. A method according to claim 1, characterized in that interval times which are shorter than a single wiping operation are not stored.

5. A method according to claim 1, characterized in that the current interval time is shortened without a change of the stored interval time in that a switch is actuated which has a switch position "premature wiping operation ON" so that a premature wiping operation is performed with which the use of the stored interval time is resumed.

6. A method according to claim 1, characterized in that a washer is provided and the wiping-washing function of said plant is adapted to be started in conjunction with a shortening of the current interval time without a change of the stored interval time, and the use of the stored interval time is resumed with the last wiping operation performed in the wiping-washing mode.

7. An interval switch for an electric-motor-driven wiper in vehicles, comprising a relay, which is encapsulated in a housing and serves to actuate the wiper, and a control circuit for controlling the interval of time between wiping movements of wipers in vehicles, wherein the interval of time between two consecutive wiping movements is noted and is set by means of a selector switch, which has at least the switch positions "wiping operation OFF" and "interval operation ON", and by means of an electric control circuit, by which the interval of time between two consecutive wiping movements (hereinafter called interval time) is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized, wherein the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored, characterized in that the control circuit is accommodated in the housing of the relay.

8. An interval switch for an electric-motor-driven wiper in vehicles, a control circuit for controlling the interval of time between wiping movements of wipers in vehicles, wherein the interval of time between two consecutive wiping movements is noted and is set by means of a selector switch, which has at least the switch positions "wiping operation OFF" and "interval operation ON", and by means of an electric control circuit, by which the interval of time between two consecutive wiping movements (hereinafter called interval time) is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized, wherein the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored, characterized by a turn-on sub-assembly via which the control circuit is energized, a programmable memory for the interval time, a selectively incrementing and decrementing counter for determining the interval time and for receiving the contents of the memory as an initial count $Z_a$ for a decrementing operation, a clock for delivering pulses to the counting input of the counter,

13 a decoder for detecting the lowest count ($Z_o = 0$), a decoder for detecting the highest possible count ($Z_{max}$), and a memory, which succeeds the decoder and the contents of which states whether the highest possible count ($Z_{max}$) has been reached during the last incrementing operation, a decoder for detecting counts $Z_c$ which are lower than $Z_{max}$ and higher than a predetermined count $Z_p > Z_o$, a selector switch for selecting the mode of operation of the wiper, and a pulse generator for delivering a pulse in response to each actuation of the selector switch, and gates, by which said components of the control circuit are logically connected.

9. An interval switch according to claim 8, characterized in that the data input of the memory for the interval time is connected by a controllable change-over switch either to the output of the counter or to a read-only memory, which contains the value $Z_s$ of a predetermined fixed interval time.

10. An interval switch according to claim 9, characterized in that the change-over switch is controlled by the turn-on sub-assembly.

11. An interval switch according to claim 10, comprising a relay which is encapsulated in a housing and serves to actuate the wiper, characterized in that the control circuit is accommodated in the housing which surrounds the relay.

12. An interval switch according to claim 9, comprising a relay which is encapsulated in a housing and serves to actuate the wiper, characterized in that the control circuit is accommodated in the housing which surrounds the relay.

13. An interval switch according to claim 8, characterized in that the counter operates as an incrementing counter when the ON-OFF switch is in its state OFF, and the counter operates otherwise as a decrementing counter.

14. An interval switch according to claim 8, characterized in that the output of the memory for the maximum count ($Z_{max}$) is logically combined with the input of the memory for the interval time in such a manner that the interval time stored last is kept in the memory when the counter overflows after the interval operation has been turned off ($I = 0$).

15. An interval switch according to claim 14 characterized in that a sensor is provided, which delivers a first signal ($W_{pp} = 0$) when the wiper is in its position of rest, and which delivers a different signal ($W_{pp} = 1$) when the wiper is disposed in the field to be wiped away from its position of rest, and the output of that sensor and the output of the selector switch are logically combined by a NAND gate with the memory for the maximum count ($Z_{max}$) in such a manner that when the selector switch is in the position "continuous operation ON" ($I = 0$) and the wiper is disposed in the field to be wiped away from its position of rest ($W_{pp} = 1$), the memory will be loaded with that value (Max = 1) with which it is otherwise loaded via the decoder when the maximum count ($Z_{max}$) has been reached.

16. An interval switch according to claim 15, characterized in that a follow-up counter is provided, which is set to a predetermined count Nw by the sensor and the actuating switch of a washer, the follow-up counter receiving the signals Wpp from the sensor decrements its count from Nw to zero or increments its count from zero to Nw as soon as the actuation of the actuating switch has terminated, and said follow-up counter delivers during that counting operation a signal (QW = 1) which keeps the wiper motor running.

17. An interval switch according to claim 16, comprising a relay which is encapsulated in a housing and serves to actuate the wiper, characterized in that the control circuit is accommodated in the housing which surrounds the relay.

18. An interval switch according to claim 14, comprising a relay which is encapsulated in a housing and serves to actuate the wiper, characterized in that the control circuit is accommodated in the housing which surrounds the relay.

19. An interval switch according to claim 15, comprising a relay which is encapsulated in a housing and serves to actuate the wiper, characterized in that the control circuit is accommodated in the housing which surrounds the relay.

20. An interval switch according to claim 8, comprising a relay which is encapsulated in a housing and serves to actuate the wiper, characterized in that the control circuit is accommodated in the housing which surrounds the relay.

21. A method of controlling the interval of time between wiping movements of wipers in vehicles, wherein the interval of time between two consecutive wiping movements is determined and is set by means of a selector switch, which has at least the switch positions "wiping operation OFF" and "interval operation ON", and by means of an electric control circuit, by which the interval of time between two consecutive wiping movements is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized, characterized in that the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored, wherein the interval time value stored last is kept in storage even during an interruption of the interval operation until the control circuit is deenergized.

22. A method of controlling the interval of time between wiping movements of wipers in vehicles, wherein the interval of time between two consecutive wiping movements is determined and is set by means of a selector switch, which has at least the switch positions "wiping operation OFF" and "interval operation ON", and by means of an electric control circuit, by which the interval of time between two consecutive wiping movements (hereinafter called interval time) is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized, characterized in that the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored, wherein the interval wiping operation begins with a predetermined fixed interval time when the selector switch is moved to its switch position "interval operation ON" for the first time.

23. A method of controlling the interval of time between wiping movements of wipers in vehicles, wherein the interval of time between two consecutive wiping movements is determined and is set by means of a selector switch, which has at least the switch positions "wiping operation OFF" and "interval operation ON", and by means of an electric control circuit, by which the interval of time between two consecutive wiping movements (hereinafter called interval time) is measured, at least the second of said wiping movements has arbitrarily been started by an actuation of the selector switch, the measured value is stored and is subsequently used as interval time until a renewed arbitrary starting of wiping movements by a renewed actuation of the selector switch has been effected and another interval time is stored or the interval wiping operation of the wiper is interrupted or the control circuit is deenergized, characterized in that the selector switch is moved to the switch position "wiping operation OFF" for a prolongation and for a shortening of the interval time, a single wiping movement is thus started at the same time, the selector switch is moved to the switch position "interval wiping operation ON" after an arbitrarily selected interval time, and that interval time is measured and stored, wherein a washer is provided and the wiping-washing function of said plant is adapted to be started in conjunction with a shortening of the current interval time without a change of the stored interval time, and the use of the stored interval time is resumed with the last wiping operation performed in the wiping-washing mode.

* * * * *